N. T. HARRINGTON.
LOADING AND UNLOADING APPARATUS.
APPLICATION FILED DEC. 18, 1919.

1,435,604.  Patented Nov. 14, 1922.
3 SHEETS—SHEET 1.

Inventor
Norman T. Harrington
Attys

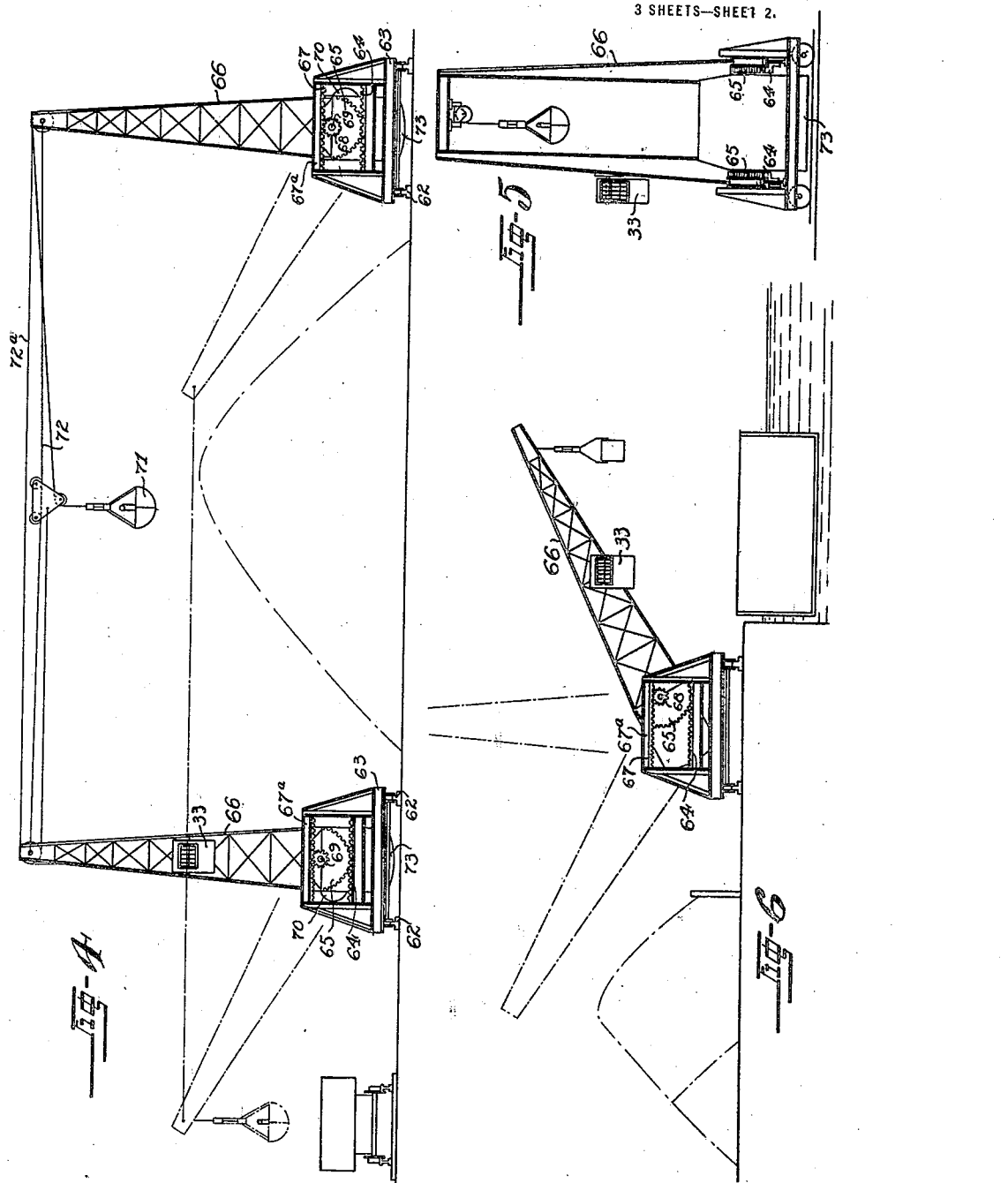

N. T. HARRINGTON.
LOADING AND UNLOADING APPARATUS.
APPLICATION FILED DEC. 18, 1919.
1,435,604.
Patented Nov. 14, 1922.
3 SHEETS—SHEET 3.
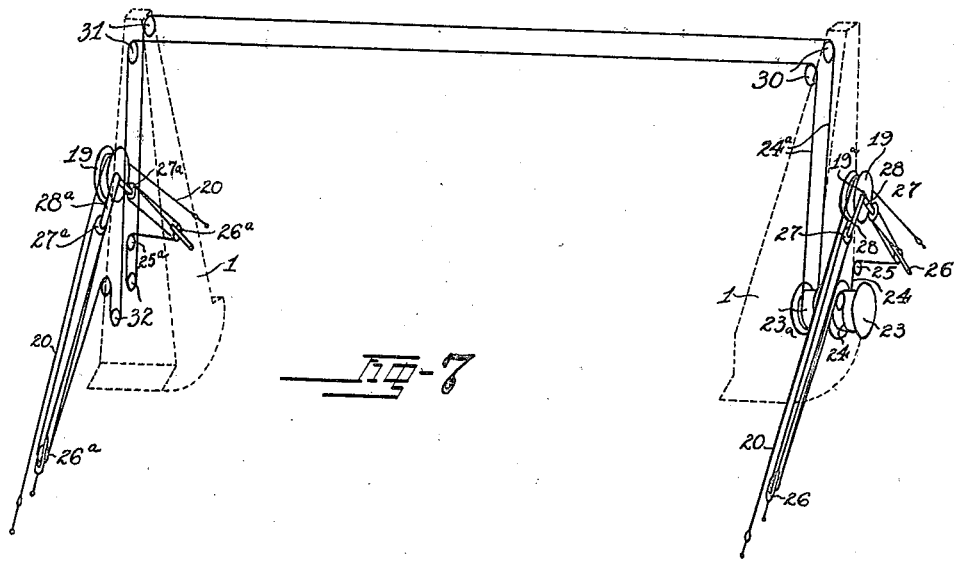
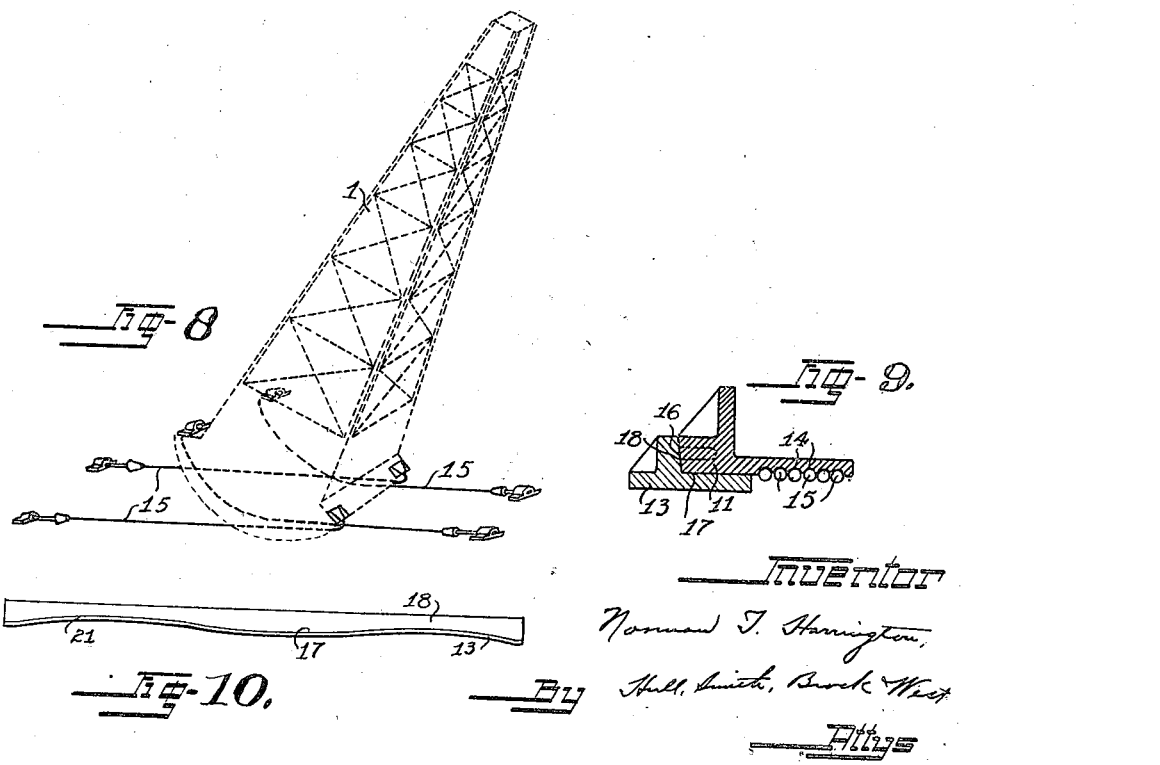

Patented Nov. 14, 1922.

1,435,604

UNITED STATES PATENT OFFICE.

NORMAN T. HARRINGTON, OF CLEVELAND, OHIO.

LOADING AND UNLOADING APPARATUS.

Application filed December 18, 1919. Serial No. 345,755.

*To all whom it may concern:*

Be it known that I, NORMAN T. HARRINGTON, a citizen of the United States, residing at Cleveland, in the county of Cuyahoga and State of Ohio, have invented a certain new and useful Improvement in Loading and Unloading Apparatus, of which the following is a full, clear, and exact description, reference being had to the accompanying drawings.

Figure 1:
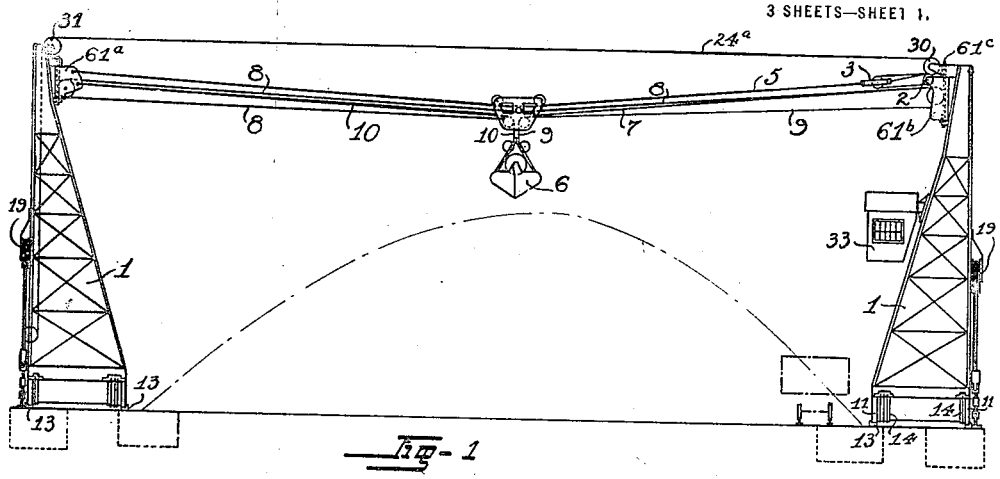
Figure 2:
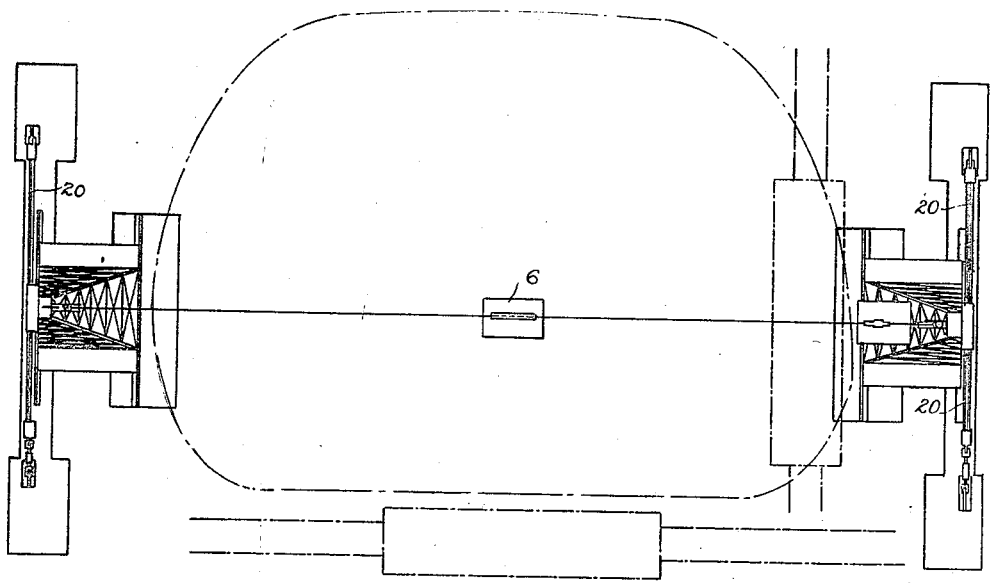
Figure 3:
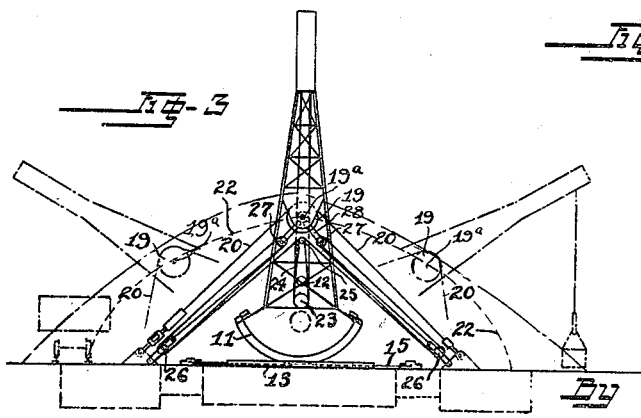

This invention relates to systems of the type that are employed for loading and unloading of materials and more particularly to systems of this kind employing one or more towers and a load-handling device, such as a bucket. The general purpose and object of this invention is to provide a system of this kind which will reduce the power required for its operation and which will operate at greater speed than other systems of the kind heretofore in use. A further and more limited object of the invention is to provide a system wherein the towers and the live loads supported thereby may be balanced; also to provide a system of this character which is comparatively economical of production and installation. I accomplish the foregoing objects and other and more limited objects which will appear hereinafter in and through the embodiments of my invention shown in the drawings forming part hereof, wherein Fig. 1 represents a somewhat diagrammatic side elevation of one such system; Fig. 2 a plan view and Fig. 3 and end elevation of the same; Fig. 4 is a side elevation of a modification of the system shown in Fig. 1; Fig. 5 a side elevation and Fig. 6 an end elevation of a single tower of the type shown in Fig. 4; Fig. 7 a diagrammatic view in perspective of the tower-rocking mechanism employed with the system as shown in Figs. 1-3 inclusive; Fig. 8 a diagrammatic perspective view of one of the towers of the last-mentioned system, showing the manner of connecting the thrust cables thereto; Fig. 9 a sectional view of a bearing preferably used for supporting towers such as in Figs. 1-3; and Fig. 10 a side elevation of such rail support, the contour of the supporting flange being exaggerated for purposes of illustration.

Describing by reference characters the various parts shown herein and with particular reference to Figs. 1-3 and 7-10 inclusive, 1 denotes each of a pair of rocking towers, one of said towers being provided near its top with sheaves 2 of a tackle, indicated at 3 and having its movable block connected to one end of a cable 5 the opposite end of which is secured to the other tower. Mounted on the cable 5 is a bucket 6 to which the travel lines 7 and 8 are attached; also the hoisting lines indicated at 9 and 10, these lines being led over suitable sheaves on the towers and to drums (not shown) of ordinary construction in the right hand tower 1.

The outer and inner faces of each tower are shown as provided with segmental bearings 11 each described from the point 12 as a center, said bearings cooperating each with a rail base 13, shown in detail in Figs. 9 and 10. The base of each tower is provided at the inner and the outer sides thereof with a series of segmental grooves 14 (see Fig. 9) each constituting a bearing surface for a thrust cable 15 secured at one end to the tower base at the upper end of its bearing surface and secured at its opposite end to the foundation on which the tower is supported and on the opposite side of the center 12 from its upper end. These cables prevent the slip of the lower ends of the towers along their tracks or supports as the towers are rocked, preventing the said towers from twisting out of alinement. The inner bearing 11 of each tower is provided with a slightly beveled lateral face 16, and the rail 13 therefor is provided with a supporting flange 17 and a beveled flange 18 complementary to the face 16. This construction of the rails enables me to accommodate for lack of alignment between the two towers, with practically a surface bearing between each segmental bearing and its rail; it also allows grease to work in freely.

Because of the peculiar arrangement of the hold-down cables (to be described hereinafter) the thrust cables on the outer sides of the tower may be considerably less than those for the inner sides, the latter cables being about triple the strength of the former.

Mounted centrally on the outer side of each tower is a sheave 19, the axis $19^a$ of which also lies in the circle having the point 12 as center. The axis of the sheave therefore normally describes a cycloid when the tower is rocked on its base.

A hold down cable 20 passes over this sheave and is secured at its ends to the foundation at points equidistant from the vertical center line of the tower. The distance of the anchoring points of the hold-down cables from the vertical center line of the tower is so chosen that the elliptic curve described by the bight of the cable is as nearly as possible coincident with the cycloid described, within the range of the rocking movement of the tower.

Various means may be resorted to in order to reduce or even eliminate the small divergence between the curves which is bound to exist over the operative range of the tower. One simple arrangement to this end is shown in Fig. 10. The rail flanges 17 which support the segmental bearings 11 may be given a slightly undulating surface of such amplitudes that the normal cycloidal curve is changed, within the range of the rocking movement of the tower, to an elliptical curve corresponding to that defined by the bight of the hold-down cable.

Thus, as the tower rocks, the sum of the portions of the hold-down cable at each side of the sheave 19 is a constant corresponding exactly to the theoretical constant with the effect that the cable may be kept uniformly taut throughout the rocking movement of the tower, whereby the tower may be held against tipping and caused to move in strictly the same plane.

It is understood that due to the appreciable diameter of the above sheave 19 the path defined by the bight of the cable 20 cannot absolutely coincide with an ellipse. Compensation can be made, however, for this error by slightly changing the location of the anchoring points which are in reality very close to the theoretical foci of the ellipse. In the claims the term "focus" or "foci" must be understood in this sense.

Furthermore, as will appear from Fig. 3, a line drawn from a point of contact of the segmental bearings 11 with their rails to the axes $19^a$ will substantially bisect the angle of the hold-down cables 20 in any position to which the towers may be rocked. This enables me to anchor the said cables rigidly and eliminates the tendency of the towers to slip or move in the bights of their hold-down cables, due to the pull of the bucket cable.

For the purpose of rocking the towers (see Figs. 3 and 7) the right hand tower is shown as provided with a drum 23 having an extension $23^a$ on a common shaft. To the drum 23 are secured two cables, indicated at 24, each of said cables extending around a sheave 25 and thence around the blocks 26 and 27 of tackles located on each side of the tower. The blocks 26 are anchored each to the foundation at a point corresponding to a focus of the curve 22. The upper blocks 27 of each tackle are supported, as by links 28, from or closely adjacent to the axis $19^a$.

In order to rock the opposite tower in unison, cables $24^a$ are led from the drum extension $23^a$ over sheaves 30 at the top of the right hand tower, around sheaves 31 at the top of the left hand tower, around sheaves 32 near the bottom of the latter tower and thence around sheaves and tackles $25^a$—$27^a$ corresponding to the sheaves and tackles 25—27 and having their anchors similarly located. With this arrangement, it will be evident that by applying power to the drum 23, the two towers may be rocked in unison; also that the cables 24, $24^a$ will assist the hold-down cables in preventing the inward tilting of the towers.

It will be noted that below the center of rotation the base of each tower is enlarged to counterweight the parts thereabove. This counterweighting is so arranged that the towers, cables, and the load-handling device and its load can be balanced exactly for any position of the towers and of the load-handling device on the cable-way.

When the towers are tilted in one direction, the cables 15 which lead in the opposite direction are under tension; and these cables prevent the twisting of the towers when the latter are tilted from a vertical position. The cables 20 effectively resist the tendency of the towers to overturn, due to the pull of the cable-way and its load. Because of the fact that the angle formed between the two parts of the cables 20 on opposite sides of the sheaves 19 is substantially bisected by a line drawn from the point of contact of the segmental bearings with their rails to the center or axis of such sheaves, there is practically no tendency for these sheaves to slip or move to a position in the bights of the cables other than that which they occupy by reason of the rocking of the tower by the cables 24. On the contrary, such slight tendency of movement as may exist is in a direction to bring the towers back to their vertical positions when they have been tilted to the limit of their respective motions; and this will help to counteract the weight of the live load.

Among the advantages secured by my system as thus far described are the following: First, the convenient and effective means for controlling the movement of both towers across a pile or a pit; second, the ability to cover a transverse area at high speed, owing to the balanced condition of the system; third, the ability to cover or serve an area at greater speed than can be obtained by any other system with which I am acquainted; fourth, the ability to reclaim all the material that the system can pile, as determined by the piling slope—this result cannot be obtained by any other ordinary system with which I am familiar; fifth, reduction of operating power coupled with increase in speed, resulting from the balancing of the system and the employment of a cable-way in such system; sixth, the cost of installation is only about half as much as the cost of a traveling crane, and the system can operate at a much higher speed than the latter.

In connection with the foregoing system, I have shown a cage or house 33 in which the various control levers and the operator are located.

In Figs. 4 to 6 inclusive there is shown a modification of my invention which differs mainly from the embodiment hereinbefore described in that the towers are mounted upon trucks which are movable along rails, the trucks carrying the necessary supports for the towers. In these views, 62 denotes the rails and 63 the trucks, the trucks being adapted to be propelled along the rails in any desired manner. Each truck is provided at opposite sides thereof with a horizontal rack 64 which is adapted to be engaged by a segmental gear 65 on each side of the base of a tower 66. Each truck is also provided with a pair of horizontal racks 67 opposed respectively to the racks 64 and each adapted to be engaged by a pinion 68 rotatably mounted upon a shaft 69 coaxial with the center of rotation of each tower, the pitch line of each segmental gear 65 being described from the center of its shaft 69. On the outer side of each tower base in Fig. 4 and below the center of rotation thereof there is applied a counter-weight 70 to relieve the cross pieces 67ᵃ of the thrust of the shaft 69 and to counter-balance the weight of the bucket 71 and cable 72, especially where the bucket is at the outer side of one of the towers—see broken lines in Fig. 4. It will be evident that, by rotating one of the shafts 69, the tower carrying the same will be rocked upon its rack 64, the center of oscillation 69 moving laterally, in accordance with the direction of rotation of the shaft. The shafts of the two towers will be connected for operation in synchronism, as by means of drums secured to the shafts of the pinions and drums on said shafts connected by a cable 72ᵃ. It will be noted that the mounting of the towers upon the trucks or carriages provides ample room for counterweighting the towers and their load, the counterweights for each tower being indicated generally at 73. Each tower is shown as forked at its upper end to enable the bucket 71 to pass therethrough and enable the load to be discharged into the vessels, cars, etc., on the opposite side of the tower from the pile on which it operates.

In the claims the term "rocking" is intended to refer specifically to arrangements having a rocking base and rocking movement proper as distinguished from pivotal movement and the expressions "angularly movable" or "angular movement" are intended to broadly refer to all arrangements in which a boom or tower is caused to assume different angular positions irrespective of the particular form of support.

Having thus described my invention, what I claim is:—

1. In a load handling device, a tower having a rocking base and means for rocking the tower, said means including two cables extending from substantially a common point on the tower through points substantially corresponding to the foci of an ellipse a portion of which closely approaches the path described by the said common point during the rocking movement of the tower.

2. In a load handling device, a tower having a rocking base, means for rocking the tower, said means including two cables extending from substantially a common point on the tower through points substantially corresponding to the foci of an ellipse a portion of which closely approaches the path described by the said common point during the rocking movement of the tower, and a support for the tower, the rocking base and its support being so correlated that the path described by said common point is substantially identical with the said portion of the ellipse.

3. In a load handling device, a tower having a rocking base, means for rocking the tower, said means including two cables extending from substantially a common point on the tower through points substantially corresponding to the foci of an ellipse a portion of which closely approaches the path described by the said common point during the rocking movement of the tower, and a support for the tower, the surface of the support being so shaped that the path described by the said common point is substantially identical with the said portion of the ellipse.

4. In a load handling device, a tower having a rocking base and a hold-down cable disposed in the general plane of the rocking movement, said cable having holding engagement with a point on the tower and passing through two points close to the foci of an ellipse a portion of which closely approaches the path described by the said point during the rocking movement of the tower.

5. In a load handling device, a tower having a rocking base and a hold-down cable disposed in the general plane of the rocking movement, the cable forming a bight engaging a point of the tower and the ends of the cable being secured at points close to the foci of an ellipse a portion of which closely approaches the path described by said point during the rocking movement of the tower.

6. In a load handling device, a tower having a rocking base, a hold-down cable disposed in the general plane of the rocking movement, said cable having holding engagement with a point on the tower and passing through two points close to the foci of an ellipse a portion of which closely approaches the path described by the said point during the rocking movement and means for modifying the rocking movement of the tower to cause the path of the said point to be substantially identical with the said portion of the ellipse.

7. In a load handling device, a tower having a rocking base, means for rocking the tower and hold-down cable means extending from lateral points on opposite sides of the tower to a common point thereon, said cable means being constructed and arranged so that the effective lengths thereof vary in proportion to the rocking movement.

8. In a load-handling device, a tower having a rocking base normally causing any point of the tower to describe substantially a cycloid, a hold-down cable, means on the tower for affording a point of attachment to the hold-down cable, a support for the base and means between the support and the base for causing the point of attachment to describe a path differing from a cycloid.

9. In a load-handling device, a tower having a rocking base normally causing any point of the tower to describe substantially a cycloid, a hold-down cable, means on the tower for according a point of attachment to the hold-down cable, a support for the base and means on the support for causing the point of attachment to describe a path differing from a cycloid.

10. A load handling device comprising two rocking towers, a cable way extending between the towers and means for rocking the towers in unison.

11. A load handling device comprising two rocking towers, a cable way extending between the towers, means for rocking the towers in unison and hold-down cables for preventing tipping of the towers toward each other during the rocking movement.

12. A load handling device comprising two rocking towers, a cable way extending between the towers, means for rocking the towers in unison and hold-down cables automatically operative to hold the towers in parallel planes during the rocking movement.

13. A load handling device comprising two rocking towers, a cable way therebetween and mechanical means for rocking the towers in unison.

14. A load handling device comprising two rocking towers, a cable way therebetween and mechanical means for rocking the towers in unison, said means including cables for transmitting motion from one tower to the other tower.

15. The combination, with a pair of towers, of a cable-way extending between and connected to said towers, a load-handling device on said cable-way, a rocking bearing for each tower, a support for each such bearing, means for rocking one of said towers upon its bearing, and connections between said tower and the opposite tower whereby the said towers will be rocked in unison.

16. The combination, with a pair of towers each having a rocking bearing below and concentric with the axis of rotation thereof, of a support for each bearing, a cable-way extending between and connected to said towers, a load handling device movable along said cable-way, means for moving said device, means for rocking one of said towers, the last mentioned means including a drum, cables connected to said drum, a tackle for each cable and having its upper block supported above the axis of rotation of said tower and equidistant with the surface of said bearing from such center of rotation, the lower blocks of said tackles being supported substantially equidistant from the axis of rotation of each tower when the latter is in a vertical position, and connections from said drum to the opposite tower whereby both towers may be rocked in unison by said drum.

17. The combination with a pair of towers each having a rocking bearing below and concentric with the axis of rotation thereof, of a support for each bearing, a cable-way connecting said towers, a load handling device movable along said cable-way, means for moving said device, means for rocking one of said towers, the last mentioned means including a drum, cables connected to said drum, a tackle for each cable and having its upper block supported above the axis of rotation of said tower and equidistant with the surface of said bearing from such center of rotation, the lower blocks of said tackles being supported substantially equidistant from the axis of rotation of each tower when the latter is in a vertical position, and connections between said cables and the opposite tower whereby both towers may be rocked in unison by said drum and cables.

18. The combination, with a pair of towers, each having a rocking bearing below its center of rotation and concentric therewith, of a cable-way extending between and connected to said towers, a support for each bearing, a sheave carried by each tower above its center of rotation, the axis of each sheave being equidistant from the center of rotation with its cooperating bearing, a load-handling device movable along said cable-way, a cable extending around each sheave and having its ends anchored on each side of and substantially equidistant from the center of rotation of its tower when the latter is in a vertical position, and means for rocking said towers in unison.

19. The combination, with a pair of towers, each having a bearing below its center of rotation, a support for each bearing, a sheave carried by each tower above its center of rotation, the axis of each sheave being equidistant from the center of rotation with its cooperating bearing, said bearings and supports being so shaped that the path described by the center of their respective sheaves are each substantially an ellipse, a cable-way connecting said towers, a load-handling device movable along said cable-way, a cable extending around each sheave and having its ends anchored on each side of and substantially equidistant from the center of rotation of its tower when the latter is in a vertical position, and means for rocking said towers in unison.

20. The combination, with a tower, of a rocking bearing and a cooperating base for said bearing, a sheave carried by said tower above its center of rotation in such manner that the path of movement of the center of rotation of said sheave, due to the rocking of the tower, is substantially an ellipse, and a hold-down cable extending around said sheave and having its ends anchored adjacent to the foci of such ellipse.

21. The combination, with a tower having a rocking bearing, of a support cooperating therewith, said support and bearing being of such shape that the path traveled by a point in said tower above the said bearing and equidistant from the center of rotation with the bearing surface will be substantially an ellipse, a drum, and a pair of cables connected to said drum and also to points adjacent to the foci of such ellipse and each extending over a sheave supported from an axis coincident with said point.

22. The combination, with a tower having a rocking bearing, of a support cooperating therewith, said bearing and support being of such shape that the path traveled by a point in said tower above the said bearing and equidistant from the center of rotation with the bearing surface will be substantially elliptical, a drum carried by said tower, cables connected to said drum and each extending around an upper and lower sheave of a tackle, the upper sheave of each tackle being supported substantially coincident with said point and the lower block of each tackle being supported each at a point adjacent to a focus of such elliptical path.

23. The combination, with a tower having a curved bearing, of a support cooperating therewith, said support and bearing being of such shape that the path traveled by a point in said tower above the said bearing and equidistant from the center of rotation therewith will be substantially elliptical, a sheave supported by said tower with its axis of rotation substantially coincident with said point, a holddown cable extending over said sheave and having its opposite ends anchored at points corresponding substantially to the foci of such elliptical path, a drum on said tower, and a pair of cables connected to said drum and each extending about an upper and a lower sheave of a tackle, the upper blocks being pivoted substantially coincident with the said point and the supports for the lower blocks being substantially coincident with the foci of such elliptical path.

24. The combination, with a pair of towers, of a cable-way extending between and supported by said towers, a load-handling device movable on said cable-way, and means for rocking said towers in unison, each of said towers having segmental surfaces concentric with its center of rotation, and cables connected at opposite ends of such surfaces and adapted to engage their respective surfaces as the tower is rocked, the opposite ends of said cables being anchored each to a suitable support, the said supports being arranged on opposite sides of the central portion of the tower.

25. The combination, with a pair of towers, and means for rocking the same, of a cable-way extending between and connected to said towers, a load handling device movable on said cable-way, bearing surfaces adjacent to opposite ends of each tower, said surfaces being concentric with the center of rotation of their respective towers, cables connected each at one end adjacent to the upper end of a bearing surface on one side of the center of rotation and adapted to engage their respective bearing surfaces as the towers are rocked and having their other ends anchored on the opposite side of such center, and cables connected each at one end to the upper end of a bearing surface on the opposite side of such center from the points of attachment of the first mentioned cables, the last mentioned cables having their opposite ends anchored at points on the side of the tower opposite their points of connection with their bearing surfaces.

26. The combination with a pair of towers, and means for rocking the same in unison, of a cable-way extending between and connected to said towers, a load-handling device movable on said cable-way, bearing surfaces adjacent to an end of each tower, said surfaces being concentric with the center of rotation of their respective towers, a cable connected at one end adjacent to the upper end of a bearing surface on one side of the center of rotation of each tower and adapted to engage its bearing surface as the towers are rocked and having its other end anchored on the opposite side of such center, and a cable connected at one end adjacent to the upper end of a bearing surface of each tower on the opposite side of such center from the first mentioned cables, the last mentioned cables having their opposite ends anchored at points on the side of the tower opposite their respective points of connection to their bearing surfaces.

27. The combination, with a pair of towers, of a cable-way extending between and supported by said towers, a load-handling device movable along said cable-way, a rocking bearing for each tower, a rail having a thrust flange arranged to cooperate with the side of each bearing, and means for rocking said towers in unison.

28. The combination, with a pair of towers, of a cable-way extending between and connected to said towers, a load-handling device on said cable-way, a rocking bearing for each tower on the inner side thereof, a rail having a thrust flange co-operating with the inner side of each bearing, and means for rocking said towers.

29. The combination, with a pair of towers each having a segmental bearing concentric with the center of rotation thereof, of a support for each bearing, a cable-way extending between and connected to said towers, a sheave supported by each tower above its center of rotation and equidistant with the surface of the bearing therefrom, a hold-down cable extending around each sheave and having its ends anchored on opposite sides of the tower and substantially equidistant from the center of rotation thereof when the tower is in a vertical position, a drum carried by one of said towers, rocking cables connected with said drum and each extending around the sheaves of upper and lower tackles, the upper sheaves being pivoted coaxially with the sheave of said tower and the lower sheaves being located on opposite sides of said tower and equidistant from the center of rotation thereof when the tower is in a vertical position, and similarly arranged tackles connected to the opposite tower, the cables extending around the sheaves of the last mentioned tackles whereby both towers may be rocked in unison by said drum and the thrust of the cable-way and its load may be supported by the said hold-down cables.

30. The combination of two angularly movable towers, a cableway extending between and supported by the towers, a load-handling device movable on said cableway, means for moving the towers in unison and means operative to counterbalance the towers and weights supported thereby in any angular position.

31. Apparatus according to claim 30 in which the counterbalancing means comprises a weight disposed near the base of the tower.

32. The combination of two angularly movable towers, a cableway extending between and supported by the towers, a load-handling device movable on said cableway, means for moving one of said towers, connections between said tower and the second tower whereby the latter will be moved in unison with the former, and a counterweight on at least one of the towers for counterbalancing the towers and weights carried thereby in any angular position.

33. The combination of two angularly movable towers, a cableway extending between and supported by the towers, a load-handling device movable on said cableway, means for moving one of said towers, connections between said tower and the second tower whereby the latter will be moved in unison with the former, and a counterweight on each tower for counterbalancing the towers, and weights carried thereby in any angular position.

34. A load-handling system comprising a pair of angularly movable towers, a cableway between and supported by the towers, a load-handling device movable on the cableway, hold-down cables for holding the towers against inward tilting, means for moving the two towers in unison, and means for counterbalancing the system and weights carried thereby, during its movement.

35. A load-handling system comprising two angularly movable towers, means between the towers operative to cause either tower to move in unison with the other tower, a cableway interconnecting the towers, a load-handling device movable on the cableway, means for counterbalancing the system and weights carried thereby, and means for imparting movement to one of the towers.

36. A load-handling system comprising two angularly movable towers, means between the towers operative to cause either tower to move in unison with the other tower, a cableway interconnecting the towers, a load-handling device movable on the cableway, hold-down cables for preventing inward tilting, means for counterbalancing the towers and weights carried thereby, and means for imparting motion to one of the towers.

37. A load-handling system comprising two rocking towers, means between the towers operative to cause either tower to move in unison with the other tower, a cableway interconnecting the towers, a load-handling device movable on the cableway, and means for imparting movement to one of the towers.

38. A load-handling system comprising two rocking towers, means between the towers operative to cause either tower to move in unison with the other tower, a cableway interconnecting the towers, a load-handling device movable on the cableway, means for counterbalancing the system, and means for imparting movement to one of the towers.

39. A load-handling system comprising two rocking towers, means between the towers operative to cause either tower to move in unison with the other tower, a cableway interconnecting the towers, a load-handling device movable on the cableway, means on both towers for counterbalancing the system and means for imparting movement to one of the towers.

40. A load-handling system comprising two rocking towers, means between the towers operative to cause either tower to move in unison with the other tower, a cableway interconnecting the towers, a load-handling device movable on the cableway, means on at least one of the towers for counterbalancing the system, and means for imparting movement to one of the towers.

41. In a load-handling device, an angularly movable tower and means for moving it, said means including cable lengths extending from substantially a common point on the tower through points substantially corresponding to the foci of an ellipse, a portion of which closely approaches the path described by the said common point during the angular movement of the tower.

42. In a load-handling device, an angularly movable tower and a hold-down cable, the cable having a holding engagement with a point on the tower and passing through two points close to the foci of an ellipse, a portion of which closely approaches a path described by the said point during the angular movement of the tower.

In testimony whereof, I hereunto affix my signature.

NORMAN T. HARRINGTON.